Patented Mar. 18, 1930

1,750,939

UNITED STATES PATENT OFFICE

WILLIAM B. NEWKIRK, OF RIVERSIDE, ILLINOIS, ASSIGNOR TO INTERNATIONAL PATENTS DEVELOPMENT COMPANY, OF WILMINGTON, DELAWARE, A CORPORATION OF DELAWARE

METHOD OF MAKING DEXTROSE

No Drawing. Application filed January 17, 1925. Serial No. 3,105.

My invention relates to the manufacture of a high purity, crystalline dextrose derived from starch or starch bearing materials.

In Patent No. 1,471,347 granted to me October 23, 1923, methods of manufacturing both hydrate and anhydrous dextrose were described. The solution of the problem in the manufacture of this product in a granular or pulverulent state and having a high purity and white color involves the production in the crystallizer of a magma of dextrose crystals and mother liquor of such character that the mother liquor can be completely purged from the mass of crystals, for example, in a centrifugal machine. In accordance with the method described in this patent a purgeable magma can be obtained, with converted liquors of ordinary purity (89% to 90% dextrose) by carrying out the crystallizing operation with the magma in gentle movement and by maintaining conditions of density and temperature such as to be favorable in a very definite way to the production either of the anhydride or the hydrate. As these conditions are sometimes difficult to maintain in ordinary factory practice, an improvement of very practical value was made and disclosed in my application Serial No. 736,945 filed September 10, 1924. In accordance with this improvement the quantity of the solid phase dextrose, either in the solution initially as seed or developed by crystallization or both, is utilized to control the induction of new crystals so that less care and attention has to be paid to the maintenance of other conditions during the crystallizing operation than was necessary with the methods of Patent 1,471,347. The danger to be guarded against is, apparently, a tool rapid crystallization which tends to become uncontrollable thereby causing formation of minute and deformed crystals instead of the normal anhydrous or hydrate crystals, as the case may be. This too rapid crystallization may occur because under certain circumstances the natural velocity or crystallization may be high, or it may result from too high a degree of supersaturation or from both causes combined. The presence of impurities in the solution tends, according to the amount and also the character of the impurities, to retard initial crystallization so that before crystallization starts excessive supersaturation will occur followed, when crystallization begins, by a sudden crystallization so rapid as to be very likely to produce an unpurgeable magma of false grain instead of the body of purgeable normal crystals desired. A common starch converted dextrose solution of 89% purity, and without the presence of the solid phase, may reach a supersaturation equivalent to approximately 30% dextrose, that is, approximately 30% more dextrose than the liquor will contain at saturation, before crystallization is initiated. The presence in the solution of the relatively large quantity of solid phase dextrose of the proper crystal type and properly distributed through the solution serves to so control crystallization even under conditions of high supersaturation that a purgeable magma of normal crystals is produced.

On further investigation and experimentation, I have found that equivalent results can be obtained, to a certain extent at least, by other means than the use of large quantities of the solid phase dextrose. The difficulty of control being due to excessive supersaturation, it was found that a purgeable magma could be obtained if normal crystallization could be initiated at lower degrees of supersaturation. This I have discovered to be possible under properly regulated conditions, as will be hereinafter described.

The following are illustrative examples of the manner in which the principles of my present invention may be put into practice.

(a) If a relatively impure dextrose, such as the "third sugar" of Patent No. 1,471,347 which, as stated in the patent, may contain too high a percentage of impurities (4% or 5% for example) to make its marketing desirable, is completely melted with the addition of water to the desired gravity, 40° Baumé, or thereabouts, (calculated at 100° F. as is customary in this industry) and then crystallized in motion, as described in that patent, within what has been usually termed the anhydrous temperature range—120°

Fahrenheit or above, supersaturation of the solution will induce the formation of anhydrous crystals spontaneously without the addition of any seed crystals at all. Under these conditions crystallization will be initiated as soon, approximately, as supersaturation occurs. Of course, the use of seed crystals, if of the proper anhydrous type, will not be any detriment but under certain conditions an aid. As the solid phase in the magma increases the temperature may be lowered, since with the large quantity of solid phase present and equally distributed in the solution the degree of supersaturation can be increased without bringing about the formation of false grain. The advantage of the temperature reduction is that with the resulting increase in the degree of supersaturation crystallization takes place more rapidly, giving a larger yield for a given period of treatment. One can, in fact, produce the anhydride with lower initial temperatures than those mentioned provided the solution is liberally seeded with anhydrous crystals at the start, but this is at the sacrifice of one of the advantages of this phase of my invention which is to avoid the employment of seed or at least large quantities of seed. The crystallizing magma is kept in movement, preferably, so that the solid phase dextrose as formed, is uniformly distributed, with the result that the crystals develop singly, not in groups or clusters.

When crystallization is complete the magma is centrifuged as described in Patent No. 1,471,347, and with proper washing will yield a sugar which is very close to absolute purity.

In the preferred practice of the process as just described an important advantage is obtained in that the entire batch is net yield. None goes for seed for the next batch. It may be stated that it makes no difference whether the sugar melted is hydrate or the anhydride, or a mixture of both.

(b) If an impure anhydrous dextrose is incompletely melted so that a certain number of crystals are left in the solution, crystallization, with the resultant formation of a purgeable anhydride magma, can be carried out, without the addition of any seed, and under conditions otherwise as stated in Example (a).

(c) Similarly, if an impure hydrate dextrose such, for example, as the "third sugar" mentioned above is incompletely melted it may be crystallized without difficulty at temperatures within the hydrate range (105° Fahrenheit and lower), and even at higher temperatures up to 130° Fahrenheit, without the use of seed. In both (b) and (c) the initial temperatures may be reduced after a certain amount of solid phase forms in order to increase yield.

The desired results are obtained, apparently, in Examples (a), (b) and (c) for the following reasons:

There are two kinds of dextrose known as alpha and beta. The alpha dextrose has a specific rotation of 110° approximately, to the right of course. The beta has a specific rotation, in the same direction, of 19°. A mixture of the two at equilibrium will have a specific rotation of approximately 52.5° to the right. The understanding is that a dextrose solution, whether initially alpha or beta or unbalanced mixtures of the two, tends to change in part, from alpha to beta or beta to alpha, as the case may be, until an equilibrium is reached. This equilibrium is the equilibrium between the anhydrous and the hydrate phases of the alpha and beta dextrose. The alpha anhydrous dextrose tends to crystallize in crystals of normal form (if the solution is kept in movement) under the following conditions: (1) unbalanced equilibrium in the alpha anhydrous direction; (2) from equilibrium provided the solution is relatively free from impurities and the temperature is not too low. The monohydrate alpha dextrose tends to crystallize as normal hydrate crystals (with the solution in movement) under the following conditions: (1) unbalanced equilibrium in the alpha monohydrate direction; (2) relatively low temperatures; (3) the presence of impurities. A mixture of alpha and beta dextrose in an alcohol solution (the term "solution" without qualification intending herein a water solution) will crystallize as Tanret's mixture (alpha and beta) under the following conditions: (1) Relatively stable equilibrium as between alpha and beta, (2) extremely low temperatures (about 32° Fahrenheit or lower), (3) high purity of the solution.

Anhydrous beta dextrose crystallizes under the following conditions: (1) highly unbalanced condition in the direction of beta anhydrous dextrose, (2) temperatures approximately 208° Fahrenheit or higher, (3) high purity of the solution. So far as I know the equilibrium mixture (Tanret's) and the beta dextrose do not crystallize as a hydrate.

The alpha anhydrous and hydrate (the dextroses of commerce) can be made to crystallize out of solution even when the conditions as above noted in respect to each of these types are unfavorable, provided there be a large quantity of appropriate solid phase present.

Thus when a relatively impure sugar (but having a higher purity than the ordinary converted liquor) is completely melted an equilibrium is established between the alpha and the beta dextrose, that is between the anhydrous and the hydrate phases of the alpha and beta dextrose, and as the suppressing influences of the impurities on the alpha anhydrous dextrose are low the anhydrous dextrose crystallizes out more readily than the hydrate. The resultant crystals will be properly formed, normal anhydrous crystals. As the anhydrous sugar comes out of the solution the balance will be changed in the solution in the direction of the alpha anhydrous dextrose. Thus the crystallization is regular and normal and will take place without excessive initial supersaturation.

The same conditions obtain only in an increased degree if the solution consists of a partially melted anhydrous sugar. Any mixture of solid phase dextrose and a saturated dextrose solution, whether the solution be in a state of equilibrium or not, is unbalanced in the direction of the solid phase present in the mixture. Crystallization takes place when the balance is disturbed in the direction of the solid phase present, as soon, that is, as supersaturation occurs. The impurities are a factor as above stated, in that they tend to force crystallization to the hydrate and retard initial crystallization. With a partially melted anhydrous sugar there is an unbalanced condition as between the solid phase or unmelted dextrose and the dextrose in solution which latter is in the alpha anhydrous phase and has had no chance, due to the presence of the solid phase, to change to equilibrium. Consequently there are no difficulties in producing a proper anhydrous sugar of normal anhydrous crystal structure from such a solution so long as the temperatures are not too far within the hydrate range. Similarly, if one melt up hydrate dextrose, but incompletely, so as to leave hydrate crystals in the solution, the solution is predominantly alpha monohydrate, not yet equalized, and readily re-crystallizes as well formed or normal hydrate crystals.

By "normal crystals" I mean crystals of substantial cross sectional areas in respect to all axes so that the magma has a hard, granular or sandy consistency in distinction to a magma containing "false grain", to-wit, very minute or flake-like or needle-like crystals which, if they are present, at least in relatively large quantities, give the magma a soft or mushy consistency. The test is that a magma of the first mentioned sort is completely or substantially completely purgeable by centrifuging, while one of the other sort is not so purgeable. The flake-like or needle-like crystals break down and the minute or microscopic crystals fill up the voids between the normal grains, when the magma is subjected to centrifugal force in the centrifugal machine, so that the mother liquor cannot find its way out. A possible remedy is a prolonged washing operation. This is only partially effective at best if the magma contains any considerable amount of false grain and may involve, moreover, a considerable loss in yield through dissolving of the sugar in the wash water.

By the phrase "one crystal type or the other", or equivalent language, I mean either the anhydrous or the hydrate type.

This application is a continuation in part of my co-pending application Serial No. 730,374 filed August 6, 1924. It might be stated that the improvement in the method of making dextrose described in my pending application Serial No. 736,945 recognizes and is based upon the tendency of dextrose solutions of the kind ordinarily produced by the conversion of starch through the method of acid hydrolysis to crystallize only at excessive degrees of supersaturation suddenly and rapidly and, therefore, uncontrollably, with the resultant formation of false grain. The invention disclosed in said application Serial No. 736,945 provided for counteracting this tendency by use of solid phase dextrose of the crystal type to be induced sufficient in quantity to control crystallization when such sudden and rapid initiation takes place. One of the principles of the improvement disclosed in the present application and in my application Serial No. 730,374 is quite different from this. Instead of counteracting the tendency to uncontrollable crystallization due to excessive supersaturation, my present invention, recognizing that the high degree of supersaturation is inevitable when the ordinary converted liquors are crystallized, seeks to remove the cause of the trouble by employing solutions of such character that the dextrose will readily crystallize from them at relatively low degrees of supersaturation. Obviously this method might be used in conjunction with the method disclosed in application Serial No. 736,945, as exemplified in methods (b) and (c) in which the solid phase left unmelted, being the larger, better formed grains, naturally, will act to control crystallization exactly as would solid phase produced in an earlier formed batch and introduced into the solution. That is, similar results are obtained whether the solid phase used for controlling crystallization is introduced into the solution from the outside or created in the solution and then ridded of its false grain by the partial melting operation.

In order to produce a crystalline dextrose which shall be practically pure (99.5% to 100% dextrose—not considering water of crystallization in the hydrate) it is necessary to keep the crystallizing magma in movement so that the crystals will form singly and not in groups and to purge the magma of its mother liquor while it is in a fluent or semi-solid state. However, my invention will have some advantages in the direction of obtaining a higher purity when employed in the manufacture of block sugar involving carrying the crystallization to the point, or nearly to the point, of solidification and the subsequent removal of the mother liquor by centrifuging or pressing.

Other modifications will suggest themselves to those familiar with this art so that I wish it to be understood that I propose to cover by patent all modifications and variations within the scope of the appended claims. Inasmuch as practice, especially with respect to the processes of conversion, will differ in different manufacturing establishments, some discretion as to details of the manner of carrying out the methods of my invention must of necessity be left to the operator.

I claim:

1. Method of making dextrose which comprises incompletely melting the impure solid or semi-solid dextrose of substantially one crystal type and bringing about supersaturation of the solution so formed to induce crystallization of the dextrose in solution in the form of crystals of the type of the unmelted dextrose.

2. Method of making dextrose which comprises incompletely melting the impure solid or semi-solid dextrose of substantially one crystal type and bringing about supersaturation of the solution so formed, without addition of seed, to induce crystallization of the dextrose in solution so formed to induce crystallization of the dextrose in solution in the form of crystals of the type of the unmelted dextrose.

3. Method of making dextrose anhydride which comprises incompletely melting impure solid or semi-solid dextrose of the anhydrous type and bringing about supersaturation of the solution so formed at a temperature favorable to the formation of anhydrous crystals.

4. Method of making dextrose anhydride which comprises incompletely melting impure solid or semi-solid dextrose of the anhydrous type and bringing about supersaturation of the solution so formed without the addition of seed at a temperature favorable to the formation of anhydrous crystals.

5. Method of making a purgeable mass of dextrose crystals from a starch converted dextrose solution, which consists in bringing about a crystallization of the dextrose in solution, melting in part at least the solid phase dextrose, then subjecting the mass to another crystallizing operation.

6. Method of making a purgeable mass of dextrose crystals from a starch converted dextrose solution, which consists in bringing about a crystallization of the dextrose in solution, melting in part at least the solid phase dextrose, then subjecting the mass to another crystallizing operation with the mass in gentle movement to maintain the solid phase dispersed throughout the liquid.

7. Method of making a purgeable mass of dextrose crystals from a starch converted dextrose solution, which consists in bringing about a crystallization of the dextrose in solution, melting some at least of the solid phase so as to leave the magma in an unbalanced state, and then subjecting it to another crystallizing operation.

8. Method of making a purgeable mass of dextrose crystals from a starch converted dextrose solution, which consists in bringing about a crystallization of the dextrose in solution, melting some at least of the solid phase so as to leave the magma in an unbalanced state, and then subjecting it to another crystallizing operation with the mass in gentle movement to maintain the solid phase dispersed throughout the liquid.

9. Improvement in the method of making a purgeable mass of dextrose crystals from a starch converted dextrose solution, which consists in bringing about crystallization of the dextrose in solution, melting a part of the solid phase so formed and then subjecting the magma to another crystallizing operation.

10. Improvement in the method of making a purgeable mass of dextrose crystals from a starch converted dextrose solution, which consists in bringing about crystallization of the dextrose in solution, melting a part of the solid phase so formed and then subjecting the magma to another crystallizing operation with the magma in gentle movement to maintain the solid phase dispersed throughout the liquid.

11. Improvement in the method of producing a high purity granular dextrose from a solid dextrose of relatively low purity and predominantly of one crystal type which consists in partially melting the solid impure dextrose so as to leave some of it in the solid phase, bringing about supersaturation of this magma to produce crystallization in the form of separate naturally formed crystals, and removing the mother liquor from the crystals while the magma is in a fluent condition.

12. Improvement in the method of producing a high purity granular dextrose from a low purity solid dextrose predominantly of one crystal type which consists in partially melting the solid impure dextrose so as to leave some of it in the solid phase, bringing about supersaturation of this magma within a range of temperatures favorable to the production of the aforesaid type of crystals, and after crystallization has taken place, removing the mother liquor from the crystals while the magma is in a fluent condition.

13. Improvement in the method of producing a high purity granular dextrose from a solid dextrose of relatively low purity and of predominantly one crystal type which consists in partially melting the solid impure dextrose so as to leave some of it in the solid phase, bringing about supersaturation of this magma to produce crystallization while maintaining the solid phase dispersed throughout the liquid, and removing the mother liquor from the crystals while the magma is in a fluent condition.

14. Method of treating solid dextrose of relatively low purity for the production of a purer product in the form of separate, naturally formed crystals which consists in partially melting the impure dextrose so as to leave some of it in the solid phase and bringing about supersaturation of this magma to produce the formation of crystals of the same crystalline type as the unmelted solid phase while maintaining the solid phase dispersed throughout the liquid, and removing the mother liquor from the crystals while the magma is in a fluent state.

15. Method of producing a high purity crystalline dextrose from a starch converted dextrose solution which comprises bringing about crystallization of the dextrose in such solution, heating the product so as to melt some of the crystals while leaving enough of the solid phase to control subsequent crystallization, and then supersaturating this magma to produce crystallization.

16. Method of producing a high purity crystalline dextrose from a starch converted dextrose solution which comprises bringing about crystallization of the dextrose in such solution, heating the product so as to melt some of the crystals while leaving enough of the solid phase to control subsequent crystallization, then supersaturating this magma to produce crystallization while maintaining the solid phase dispersed throughout the magma, and removing the mother liquor from the crystals while the magma is in a fluent state.

17. Method of producing a high purity, crystalline dextrose from a starch converted dextrose solution, which comprises bringing about crystallization of the dextrose in such solution, making a partial separation as between the dextrose and mother liquor, melting the dextrose but incompletely so as to leave enough of the crystals in the solution to control subsequent crystallization, supersaturating this magma to produce crystallization while maintaining the solid phase dispersed throughout the magma, and removing the mother liquor from the crystals while the magma is in a fluent state.

18. Improvement in the method of treating mixtures of crystallized dextrose and impurities incapable of complete purgation by centrifuging for the production of a high purity, crystalline dextrose, which consists in incompletely melting the dextrose so as to leave enough of it in the solid phase to control subsequent crystallization, subjecting the magma so produced to a second crystallizing operation and then removing the mother liquor from the crystals.

19. Improvement in the method of treating mixtures of crystallized dextrose and impurities incapable of complete purgation by centrifuging for the production of a high purity, crystalline dextrose, which consists in incompletely melting the dextrose so as to leave enough of it in the solid phase to control subsequent crystallization, subjecting the magma so produced to a second crystallizing operation while maintaining the solid phase dispersed throughout the magma, and centrifuging the magma while in a fluent state to remove the mother liquor from the crystals.

20. Method of making a high purity crystalline dextrose from a starch converted dextrose solution which comprises crystallizing the dextrose in solution, partially melting the solid dextrose so as to eliminate crystals of the non-purgeable type and leave a body of crystals to control subsequent crystallization, crystallizing this magma while keeping the solid phase in dispersion, and then extracting the mother liquor from the crystals.

21. Method of making a high purity crystalline dextrose from a starch converted dextrose solution which comprises crystallizing the dextrose in solution, partially melting the solid dextrose to leave a body of crystals of substantially one crystal type only and of normal form for that type, crystallizing this magma while keeping the solid phase in dispersion, and then extracting the mother liquor from the crystals.

22. Method of making a high purity crystalline dextrose from a starch converted dextrose solution which comprises subjecting the solution to a crystallizing operation, partially melting the solid substance so as to produce a solution containing some dextrose crystals, subjecting this magma to a crystallizing operation while keeping the crystals dispersed throughout the liquid, and then centrifuging the magma to extract the mother liquor from the crystals.

WILLIAM B. NEWKIRK.